US008231087B1

(12) United States Patent
Giordano, Jr.

(10) Patent No.: US 8,231,087 B1

(45) Date of Patent: Jul. 31, 2012

(54) PORTABLE FOLDING MIXING DRILL STAND

(76) Inventor: Rocco J. Giordano, Jr., Atlantic Highlands, NJ (US)

( * ) Notice: Subject to any disclaimer, the term of this patent is extended or adjusted under 35 U.S.C. 154(b) by 781 days.

(21) Appl. No.: 12/319,382

(22) Filed: Jan. 7, 2009

(51) Int. Cl.
*F16M 11/38* (2006.01)
*F16M 11/24* (2006.01)

(52) U.S. Cl. ........ 248/166; 248/165; 248/150; 108/115; 211/195; 297/36

(58) Field of Classification Search .................. 248/150, 248/149, 166, 167, 436, 172, 165, 136, 152, 248/463, 99, 97, 95, 127, 671, 676, 640, 248/132, 176.1, 173, 176.3; 211/195, 132.1, 211/175, 181.1, 149, 85.31, 201; 297/6, 297/36, 344.18; 135/74, 95; 108/115, 116; 312/258, 262; 224/409; 269/71, 74; 29/281.1; 220/9.2, 9.3; 280/47.34, 639; 222/608
See application file for complete search history.

(56) References Cited

U.S. PATENT DOCUMENTS

| | | | | | |
|---|---|---|---|---|---|
| 234,230 | A | * | 11/1880 | Bovey | 297/36 |
| 1,500,964 | A | * | 7/1924 | Starks | 141/237 |
| 2,115,956 | A | | 5/1938 | Jorgenson | 259/108 |
| 2,227,331 | A | | 12/1940 | Wilhelm | 259/103 |
| 2,528,721 | A | * | 11/1950 | Brockman et al. | 135/152 |
| 2,626,788 | A | | 1/1953 | Ragland | 259/97 |
| 2,705,134 | A | | 3/1955 | Jerner, Sr. | 259/160 |
| 2,854,202 | A | | 9/1958 | Blume, Jr. et al. | 248/16 |
| 2,857,227 | A | * | 10/1958 | Jacques | 108/124 |
| 2,887,348 | A | * | 5/1959 | Sadowsky | 108/124 |
| 2,902,325 | A | * | 9/1959 | Koett et al. | 248/167 |
| 2,944,799 | A | | 7/1960 | Larson | 259/177 |
| 3,166,303 | A | | 1/1965 | Chapman | 259/135 |
| 3,319,941 | A | | 5/1967 | Isaacs, Jr. et al. | 259/161 |
| 3,379,415 | A | | 4/1968 | Logue | 259/44 |
| 3,412,813 | A | | 11/1968 | Johnson | 173/141 |
| 3,820,763 | A | | 6/1974 | Questi, Sr. et al. | 259/178 |
| 3,938,673 | A | | 2/1976 | Perry, Jr. | 214/2 |
| 3,957,071 | A | * | 5/1976 | Kenner | 135/66 |
| 3,976,147 | A | * | 8/1976 | Cunningham | 173/185 |
| 4,063,716 | A | | 12/1977 | Aitken, Jr. | 366/100 |
| 4,067,562 | A | * | 1/1978 | Weber | 269/71 |
| 4,195,933 | A | | 4/1980 | Brailsford | 366/2 |
| 4,196,675 | A | * | 4/1980 | Cook | 108/6 |
| 4,437,413 | A | * | 3/1984 | O'Brian et al. | 108/162 |
| 4,577,971 | A | | 3/1986 | Burcham | 366/76 |
| 4,684,259 | A | | 8/1987 | Rice et al. | 366/185 |
| 4,761,076 | A | | 8/1988 | Witcombe | 366/46 |
| 4,783,031 | A | * | 11/1988 | Ebentheuer | 248/97 |
| 5,026,168 | A | | 6/1991 | Berryman et al. | 366/168 |
| 5,041,058 | A | | 8/1991 | Quimby | 460/61 |

(Continued)

FOREIGN PATENT DOCUMENTS

GB 2161071 A * 1/1986

*Primary Examiner* — Kimberly Wood

(74) *Attorney, Agent, or Firm* — Goldstein Law Offices, P.C.

(57) ABSTRACT

A mixing drill stand, for supporting a mixing drill having a mixing drill bit perpendicularly above a ground surface. The stand includes a rear panel and a pair of side panels that selectively fold substantially flat, and selectively deploy where the side panels extend substantially perpendicular to the rear panel, and support a drill support assembly in a horizontal position with respect to the ground surface. The drill support assembly has a central opening through which the mixing drill bit extends toward the ground surface while the mixing drill is supported by the drill support assembly.

12 Claims, 7 Drawing Sheets

U.S. PATENT DOCUMENTS

| | | | | | |
|---|---|---|---|---|---|
| 5,049,013 | A | | 9/1991 | Engles et al. | 409/231 |
| 5,080,259 | A | | 1/1992 | Hadley | 222/83.5 |
| 5,222,536 | A | * | 6/1993 | Hodgdon et al. | 141/390 |
| 5,257,701 | A | * | 11/1993 | Edelson | 211/149 |
| 5,417,168 | A | * | 5/1995 | Soper | 108/124 |
| 5,419,633 | A | | 5/1995 | Lorenzetti et al. | 366/40 |
| 5,474,379 | A | | 12/1995 | Perry | 366/26 |
| 5,489,151 | A | | 2/1996 | Weber | 366/247 |
| 5,586,743 | A | * | 12/1996 | Sodolak | 248/671 |
| 5,636,921 | A | | 6/1997 | Murata et al. | 366/105 |
| 5,772,318 | A | | 6/1998 | Vadnais | 366/64 |
| 5,882,067 | A | * | 3/1999 | Carbajal et al. | 297/6 |
| 5,882,098 | A | * | 3/1999 | Brown et al. | 312/258 |
| 5,904,104 | A | * | 5/1999 | Yu | 108/116 |
| 5,944,420 | A | | 8/1999 | Petit | 366/349 |
| 6,007,233 | A | | 12/1999 | Cairns | 366/42 |
| 6,030,112 | A | | 2/2000 | Milek | 366/64 |
| 6,076,958 | A | | 6/2000 | Althouse, III et al. | 366/286 |
| 6,123,445 | A | | 9/2000 | Grassi | 366/20 |
| 6,125,951 | A | * | 10/2000 | Bowser | 175/203 |
| 6,164,607 | A | * | 12/2000 | Hawkes | 248/97 |
| 6,264,360 | B1 | | 7/2001 | Lehmusvaara et al. | 366/331 |
| 6,338,493 | B1 | * | 1/2002 | Wohlgemuth et al. | 280/30 |
| 6,494,420 | B2 | * | 12/2002 | Lucero | 248/129 |
| 6,547,265 | B1 | * | 4/2003 | Enge et al. | 280/47.38 |
| 6,666,573 | B2 | | 12/2003 | Grassi | 366/26 |
| 6,749,328 | B1 | | 6/2004 | Killen | 366/48 |
| 6,802,643 | B1 | | 10/2004 | Cato, Jr. et al. | 366/262 |
| 7,066,432 | B2 | * | 6/2006 | Wood et al. | 248/99 |
| 7,226,058 | B2 | * | 6/2007 | Bouchard | 280/15 |
| 7,648,155 | B1 | * | 1/2010 | Wise | 280/639 |
| 7,712,477 | B2 | * | 5/2010 | McCarthy | 135/67 |
| 2003/0076737 | A1 | | 4/2003 | Grassi | 366/150.1 |
| 2005/0029425 | A1 | | 2/2005 | Garton | 248/346.01 |
| 2006/0075943 | A1 | * | 4/2006 | Chen et al. | 108/115 |
| 2007/0045483 | A1 | * | 3/2007 | Johnson et al. | 248/99 |

* cited by examiner

PORTABLE FOLDING MIXING DRILL STAND

BACKGROUND OF THE INVENTION

The invention relates to a mixing drill stand. More particularly, the invention relates to stand which easily deploys for steadily and sturdily supporting a mixing drill, and which folds compactly for easy storage and transportation.

In a variety of construction trades, viscous materials must be mixed prior to use. In particular, stucco, cement, mortar, grout, paint, and Thinset all must be mixed thoroughly, to ensure integrity and consistency of the finished product. In addition, in the case of mortar, thorough mixing can help reduce air entrapment which can reduce the compressive strength of the hardened mortar.

Many of these materials are too thick to be effectively mixed by hand. Other materials are used in such significant quantities, that hand mixing would be too time consuming, and would limit productivity.

Most of these materials are typically supplied in 5 gallon buckets. Accordingly, it is common practice to mix many of these materials in their original bucket with a mixing drill. A mixing drill is similar to a standard drill used for carpentry or the like, except it drives an elongated mixing bit which is designed to reach deeply into a container of a construction material in order to thoroughly stir its contents.

U.S. Pat. No. 3,166,303 to Chapman provides an example of an early hand-held mixing drill. U.S. Pat. No. 5,772,318 provides an example of a larger, gasoline powered hand-held mixer, which is best suited for mixing large quantities in concrete in a trough. U.S. Pat. No. 5,489,151 to Weber discloses a portable mixing device, which is designed to work specifically in conjunction with the opening of a standard 55-gallon drum.

Often the construction materials used by painters and masons—as well as numerous other trades—are supplied in 5 gallon buckets. Typically they are mixed using mixing drills that are held by the user immediately over the bucket. The bucket containing the construction materials is often held in place by the user's foot, and the drill is switched on to begin mixing. Not infrequently, however, under the force of the spinning dense material, the bucket can get away from the user, tip, and spill.

Assuming the mixing operation is carried out without incident, after the mixing operation the bit is withdrawn from the bucket and is commonly placed in a empty bucket, to prevent the viscous construction materials from dripping off the bit and onto the floor or ground. Inevitably, however, leaning a heavy mixing drill inside an empty bucket results in the bucket tipping over, construction materials soiling or damaging the surroundings, and sometimes also a broken mixing drill or bit.

Various devices have been proposed for mixing construction materials. U.S. Pat. Nos. 2,115,956 to Jogenson and 2,854,202 to Blume, Jr. et al. disclose portable mixers that clamp onto the side of the container whose contents they are mixing. Similarly, U.S. Pat. No. 4,063,716 to Aitken, Jr. discloses a mixer that attaches onto a wheelbarrow, and U.S. Pat. No. 4,195,933 to Brailsford discloses a mixer that attaches on top of a concrete trough. U.S. Pat. No. 5,944,420 to Petit discloses a device which is configured specifically for mixing materials inside modular containers during a manufacturing process.

U.S. Pat. No. 3,722,835 to Knott discloses a mixer mounted to a stand. The device proposed by Knott is permanently attached to a tub, which it relies on for stability. Accordingly, Knott is neither portable, nor suitable for mixing materials within their own containers.

While these units may be suitable for the particular purpose employed, or for general use, they would not be as suitable for the purposes of the present invention as disclosed hereafter.

SUMMARY OF THE INVENTION

It is an object of the invention to produce an effective solution to the need by many construction tradesmen to have an easy, safe, and spill-proof way of mixing construction materials. Accordingly, the present invention provides a mixing stand that steadily supports and holds a mixing drill in position immediately above a bucket containing a viscous construction material.

It is another object of the invention to provide a mixing drill stand that helps prevent spills. Accordingly, the mixing drill stand not only supports the mixing drill during mixing, but also holds steadily it in place after the mixing operation is complete. Thus, the possibility of the drill tipping over is greatly reduced.

It is a further object of the invention to provide a mixing drill stand that is portable and easily transportable. Accordingly, the mixing drill stand is constructed to fold easily for storage and transportation.

It is yet a further object of the invention to readily adapt for use with different sized drills, and with different sized containers. Accordingly, adapter plates are individually configured for accepting the front end of a variety of different drills, and may be easily exchanged and mounted within the support tray. Further, all vertical members are telescopic, so that the overall height, and thus the height of the drill support assembly and drill mounted therein can be easily adjusted.

The invention is a mixing drill stand, for supporting a mixing drill having a mixing drill bit, perpendicularly above a ground surface. The stand includes a rear panel and a pair of side panels that selectively fold substantially flat, and selectively deploy where the side panels extend substantially perpendicular to the rear panel, and support a drill support assembly substantially horizontally with respect to the ground surface. The drill support assembly has a central opening through which the mixing drill bit extends toward the ground surface while the mixing drill is supported by the drill support assembly.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
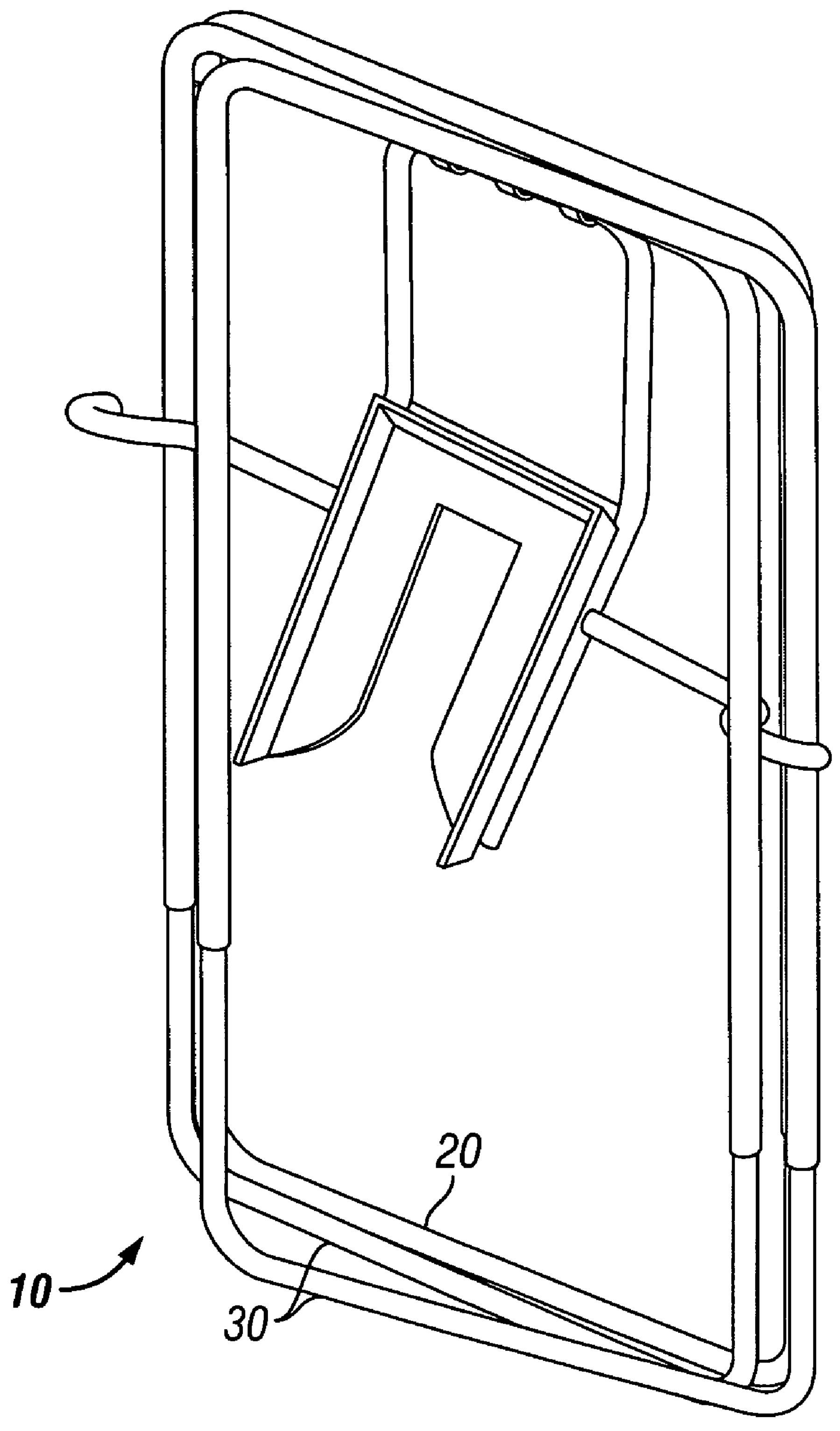
FIG. 1 is a diagrammatic perspective view, illustrating the mixing drill stand folded for storage and transportation.
Figure 2:
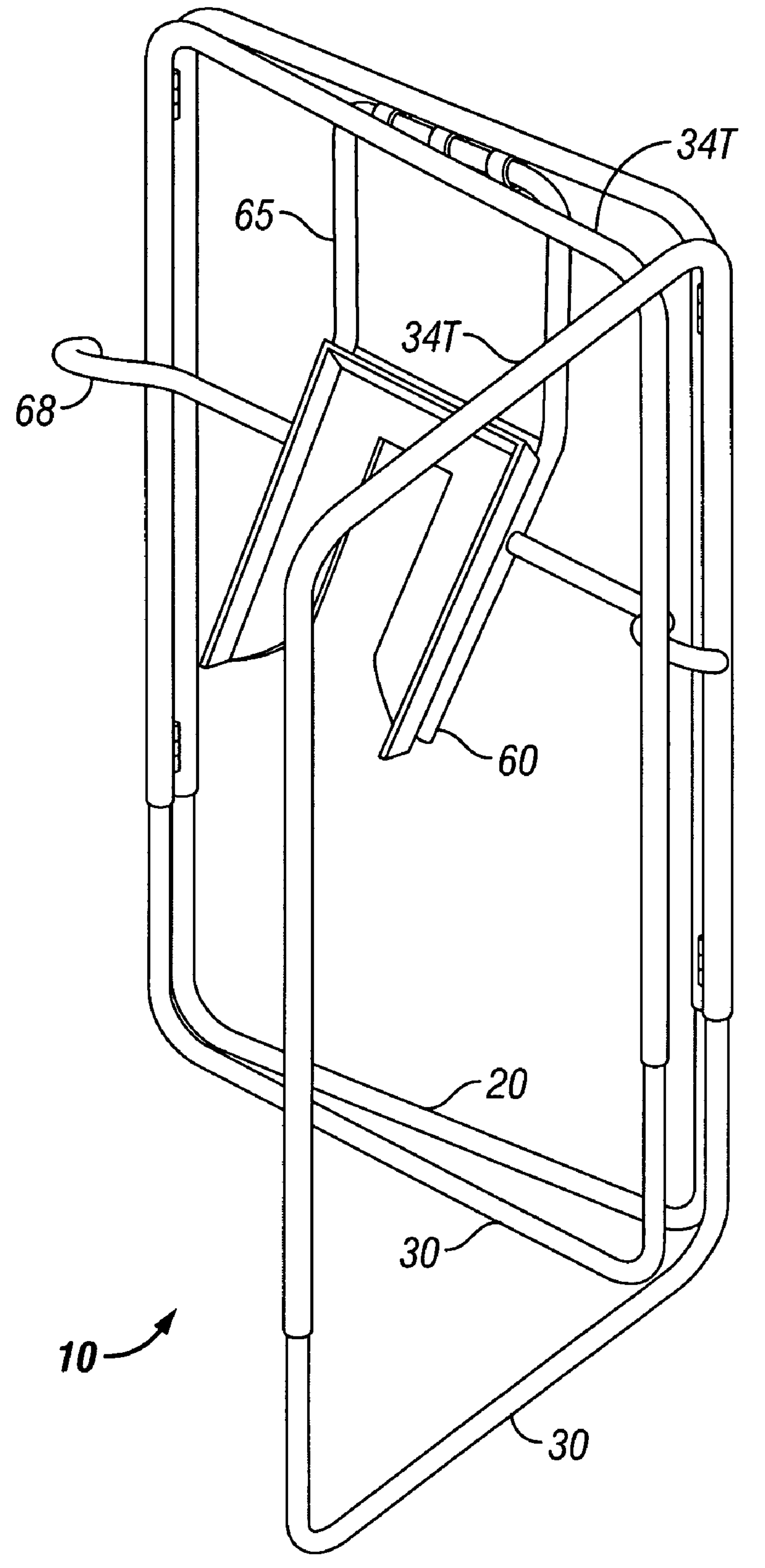
FIG. 2 is a diagrammatic perspective view, similar to FIG. 1, except wherein the stand has been partially unfolded.
Figure 3:
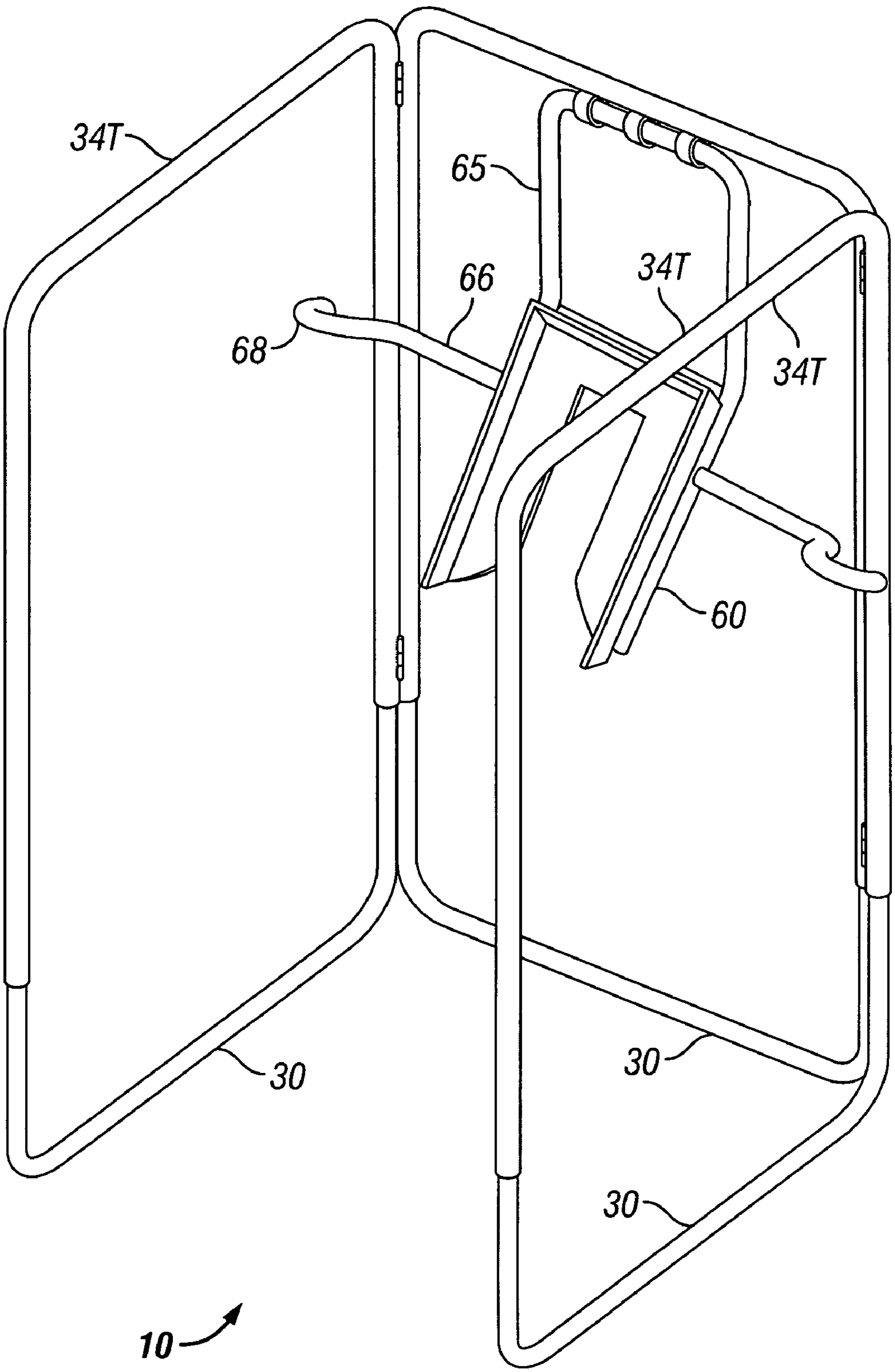
FIG. 3 is a diagrammatic perspective view, similar to FIG. 2, wherein both side panels have been unfolded, and wherein the support tray assembly is about to be pivoted upwardly to hook onto the side panels.
Figure 4:
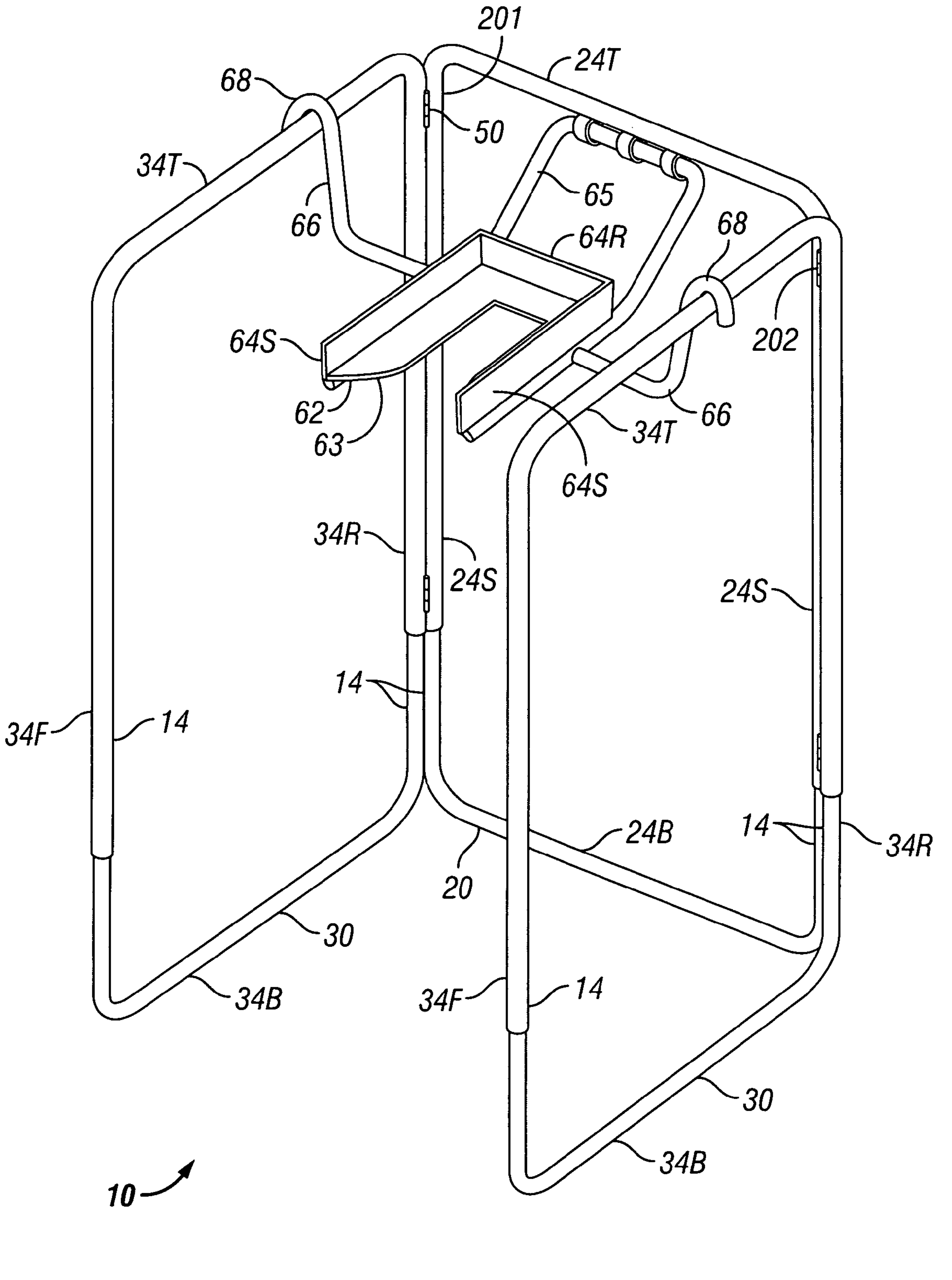
FIG. 4 is a diagrammatic perspective view, showing the mixing drill stand fully deployed and ready to use.

FIG. 1 illustrates a mixing drill stand 10, in a folded position—ready for storage and transportation. In order to better understand the components and configuration of the drill stand 10, reference is made first to the stand 10 in its fully deployed position, as illustrated in FIG. 4.

The drill stand 10 includes a rear panel 20, and a pair of side panels 30. The rear panel 20 has a first side 201, and a second side 202. One of the side panels 30 is hingedly attached to the rear panel 20 at its first side 201, and the other side panel 30 is hingedly attached to the rear panel 20 at its second side 202. While the panels 20, 30 can be solid panels, or have any other structural configuration, they are preferably constructed with vertical members 12, and horizontal members 14 that skeletally define the panels 20, 30, as illustrated in FIG. 4.

In the embodiment illustrated, each of the side panels has a front vertical member 34F, a rear vertical member 34R, a top horizontal member 34T, and a bottom horizontal member 34B. Similar the rear panel 20 has a top horizontal member 24T, a bottom horizontal member 24B, and a pair of side horizontal members 24S. Hinges 50 connect the rear vertical members 34R of the side panels 30 to the side vertical members 24S of the rear panel. Note that the hinges 50 can be configured as shown, and can also be configured with an offset to allow the panels 20, 30 to nest and/or fold fully flat, as would be readily understood and appreciated by those skilled in the field of the invention.

A drill support assembly 60 includes a shelf 62 which is substantially U-shaped, defining a central opening 63. The shelf 62 includes a rear wall 64R and a pair of side walls 64S which extend upwardly from the shelf. The side walls 64S extend substantially parallel to each other, and a side wall width is defined between the side walls 64S. Note that the drill support assembly 60 has a front 60F, and is substantially open to the central opening 63 at the front 60F. In addition, the shelf 62 has a shelf width, and the shelf 62 tapers to meet the side walls 64S at the front 60F. The drill support assembly 60 is hingedly connected to the top horizontal member 24T of the rear panel 20 with a U-shaped cradle 65, which is shaped to extend beneath and secure to each of the side walls 64S beneath the shelf 62 and also extends substantially parallel to top horizontal member 24T of the rear panel 20. A pair of support arms 66 extend laterally from the U-shaped cradle 65, substantially perpendicularly to the side walls 64S. The support arms 66 each have a hooked end 68, which extends over the top horizontal members 34T of the side panels 30 when the drill stand is deployed. When the support arms 66 are connected to the horizontal members 34T of the side panels 30 with their hooked ends 68, the shelf 62 extends substantially horizontally.

Figure 5:
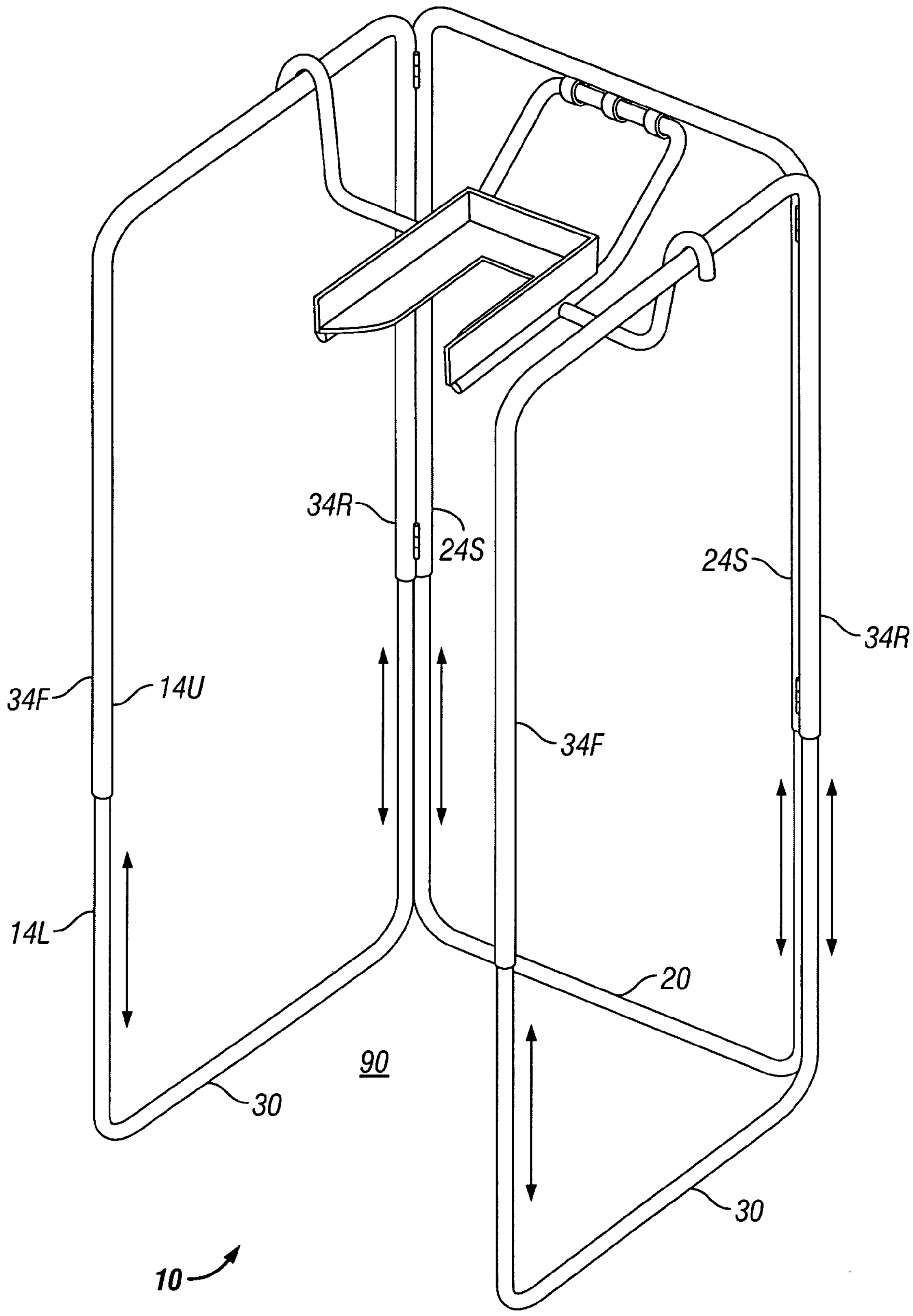
FIG. 5 is a diagrammatic perspective view, illustrating the telescopic ability of all vertical members of the side panels and rear panel.

Referring to FIG. 5, the drill stand 10 is configured to adjust in height, so as to allow for adjustment in height of the drill support assembly 60 above a ground surface 90 upon which the drill stand 10 rests. Accordingly, the side panels 30 and rear panel 20 can adjust in height. In particular, all of the vertical members 14 (including the side vertical members 24S of the rear panel 20 and the front and rear vertical members 34F, 34R of the side panels 30) are configured to telescope by having an upper tube 14U and a lower tube 14L. The upper tube 14U and lower tube 14L can be set to telescope and to fix at an adjusted position, using any variety of the myriad of mechanisms and techniques for telescoping known, appreciated, and understood by those possessing ordinary skill in the art.

Figure 6:
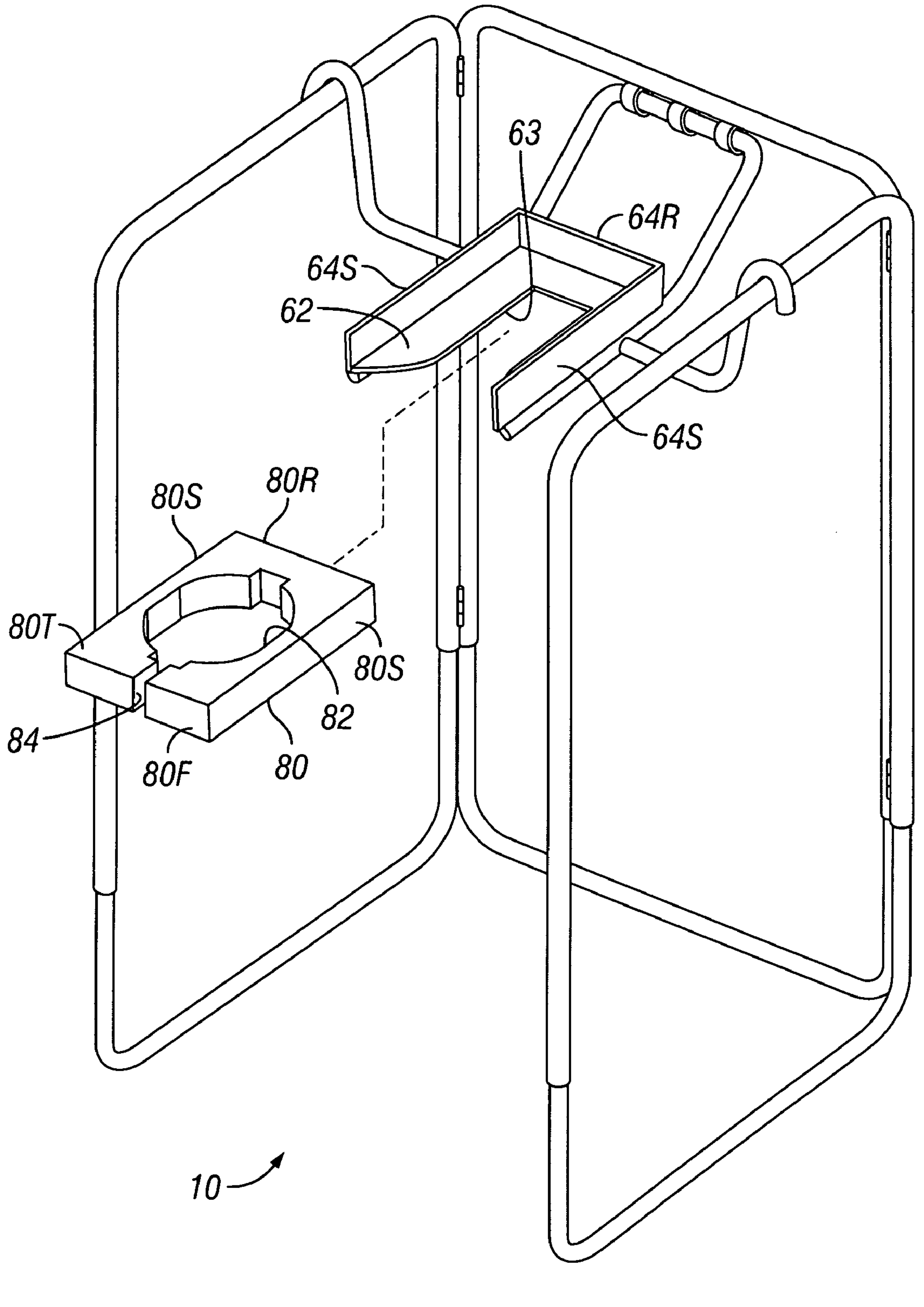
FIG. 6 is an assembly view, illustrating the installation of an adapter plate into the support tray.
Figure 7:
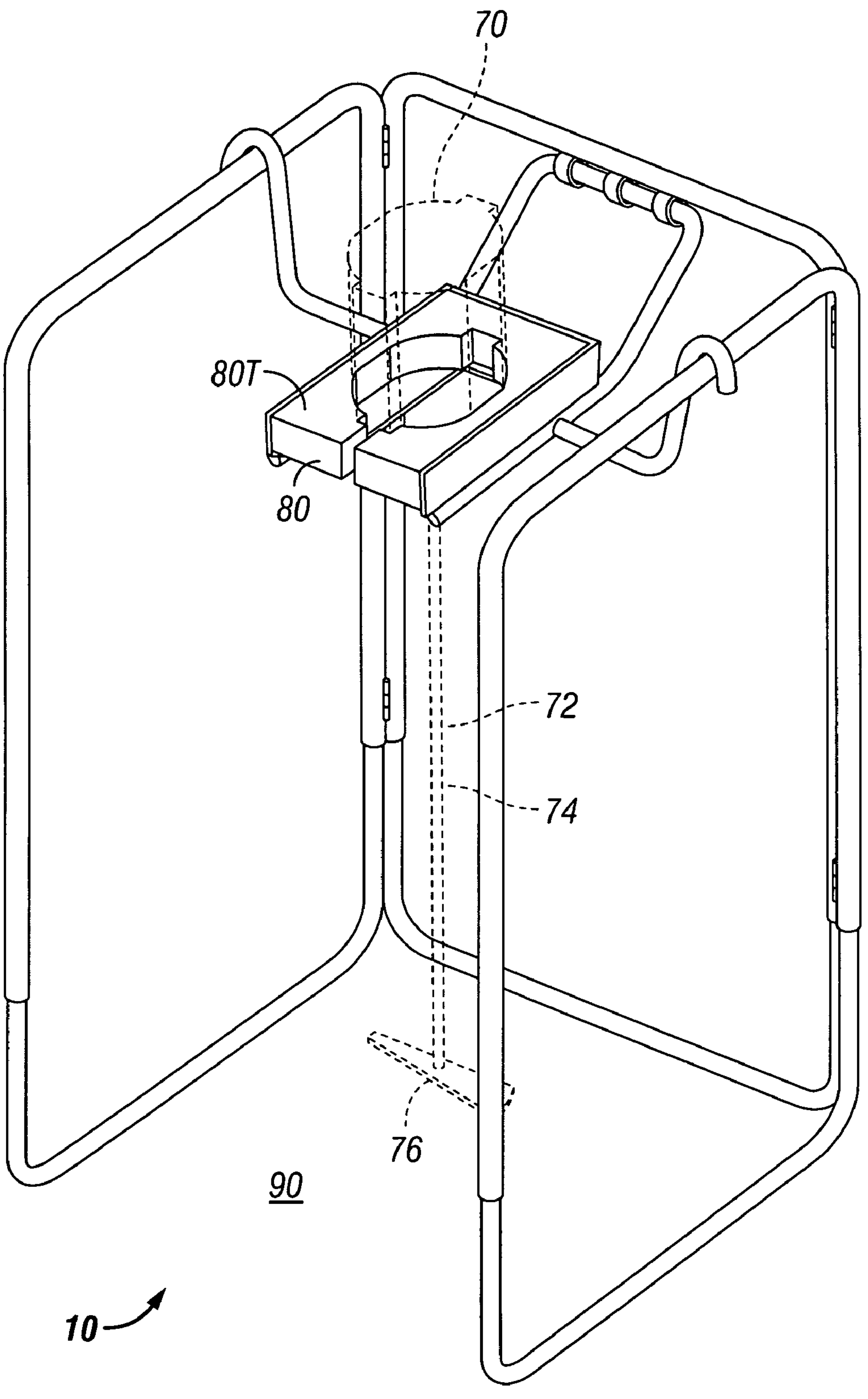
FIG. 7 is a diagrammatic perspective view, illustrating the mixing drill stand, ready for operation, wherein a mixing drill is attached within the adapter plate, supported by the support tray.

Referring to FIGS. 6 and 7, an adapter plate 80 is designed to accommodate and support a mixing drill 70—having a mixing drill bit 72, having a bit shaft 74 and mixing blade 76—within the drill support assembly 60. In particular, the adapter plate 80 has a central opening 82, a front 80F, a rear 80R, a top surface 80T, and sides 80S. The adapter plate 80 has an adapter plate width which is defined as the distance between its sides 80S. As illustrated the adapter plate 80 at the top surface 80T and around the central opening 82 may be is configured, shaped and contoured to accommodate a specific mixing 70 drill or family of drills. In particular, the adapter plate 80 is configured to hold the front end of the drill, where the bit 72 extends therefrom. In order to allow the drill bit 72 to be extended through the central opening 82 of the adapter plate 80 without the need to extend the mixing blade 76 downwardly therethrough, the front 80F of the adapter plate 80 has a bit slit 84 which extends fully from the front 80F to and in communication with the central opening 82. The bit slit 84 allows the bit shaft 74 to extend laterally through the bit slit 84, and then the mixing drill 70 can be rested upon the adapter plate 80.

The adapter plate 80 is easily inserted into and removed from the drill support assembly 60. In particular, to install (as illustrated in FIG. 6) the adapter plate 80, it is slid upon the shelf 62, with its sides 80S extending immediately between the side walls 64S, until the rear 80R of the adapter plate 80 reaches the rear wall 64R. When the adapter plate 80 is fully installed (as shown in FIG. 7), the central opening 82 of the adapter plate 80 is vertically aligned with and in communication with the central opening 63 of the drill support assembly 60. Accordingly, the mixing bit 72 extends downwardly through both central openings 82 and 63, perpendicularly toward the ground surface 90. Note that any of a variety of mechanisms, clips, and catches may be employed to hold the adapter plate 80 in place within the drill support assembly 60, and allow its release when its is desired to remove the adapter plate 80 from the drill support assembly 60.

The setup (deployment) of the mixing drill stand 10 may be followed as the sequence of FIG. 1 to FIG. 4, and the storage (folding) may be followed as the reverse sequence of FIG. 4 to FIG. 1. To be noted in particular, the side panels 30 are initially unfolded to a position wherein the side panels 30 extend perpendicular to the rear panel 20, and then the drill support assembly 60 is extended horizontally by pivoting the U-shaped cradle 65 upwardly and hooking the hooked ends 68 of the support arms 66 over the top horizontal members 34T of the side panels 30. Accordingly, the device can be assembled and ready to use in a matter of seconds. Folding the mixing drill stand 10 for storage is simply carried out in reverse. As previously noted, although the mixing drill stand folds substantially flat in the embodiment illustrated, it can be easily made to fold completely flat by adjusting and/or offsetting the hinges, and other minor modifications as would be appreciated by those possessing ordinary skill in the art.

In conclusion, herein is presented a mixing drill stand which may be quickly and easily deployed to support a mixing drill perpendicularly over a container of construction materials for allowing construction materials to be thoroughly and easily mixed. The invention is illustrated by example in the drawing figures, and throughout the written description. It should be understood that numerous variations are possible, while adhering to the inventive concept. Such variations are contemplated as being a part of the present invention.

What is claimed is:

1. A mixing drill stand, for supporting a mixing drill having a mixing bit upon a ground surface, comprising:

a rear panel, for resting upon the ground surface when deployed, having a first and second side;

a pair of side panels, one of the side panels hingedly connected to the first side of the rear panel and the other of the side panels hingedly connected to the second side of the rear panel, such that the side panels selectively fold substantially parallel to the rear panel and deploy substantially perpendicularly to the rear panel for resting upon the ground surface; and a drill support assembly, which selectively folds substantially parallel to the side panels and rear panel and selectively deploys to a position substantially perpendicular to the rear panels and side panel, the drill support assembly having a central opening for supporting the mixing drill such that the mixing bit extends substantially perpendicularly to the ground surface, wherein the rear panel and side panels each have top horizontal members; wherein the drill support assembly is hingedly connected to the top horizontal member of the rear panel; and wherein when deployed, the drill support assembly is supported at the top horizontal members of the side panels, the support assembly including a pair of support arms extending therefrom, each of the arms having a proximal end proximal to the support assembly and a distal hooked end distal to the support assembly, when the arms are deployed the hooked ends engage the top horizontal members of the side panels.

2. The mixing drill stand as recited in claim 1, wherein the drill support assembly further comprises:

a support tray having a shelf defining the central opening, the support tray open to the central opening at its front, the central opening having a width; and a rear wall and side walls extending upwardly from the shelf, a side wall width is defined as a distance between the side walls.

3. The mixing drill stand as recited in claim 2, further comprising an adapter plate, the adapter plate having a width which is slightly smaller than the side wall width for allowing the adapter plate to slide onto the shelf and between the side walls, the adapter plate having a central opening for supporting the mixing drill and allowing the mixing bit to extend downwardly through the central opening of the adapter plate and the central opening of the drill support assembly.

4. The mixing drill stand as recited in claim 3, wherein the adapter plate has a front edge, and wherein a bit slit extends from the front edge to the central opening, the bit slit allowing the mixing drill bit to extend laterally into the central opening of the adapter plate without requiring the mixing drill bit to extend downwardly into the central opening.

5. The mixing drill stand as recited in claim 4, wherein the side panels and rear panel are adjustable in height, to adjust a height of the drill support assembly above the ground surface below the stand.

6. The mixing drill stand as recited in claim 5, wherein the side panels and rear panel each have a pair of vertical members that are connected to the top horizontal member of said panel; and wherein each of said vertical members telescopes to adjust its length and thereby adjust the height of the drill support assembly.

7. The mixing drill stand as recited in claim 1, wherein the side panels and rear panel are adjustable in height, to adjust a height of the drill support assembly above the ground surface below the stand.

8. The mixing drill stand as recited in claim 7, wherein the side panels and rear panel each have a pair of vertical members that are connected to the top horizontal member of said panel; and wherein each of said vertical members telescopes to adjust its length and thereby adjust the height of the drill support assembly.

9. The mixing drill stand as recited in claim 8, wherein the drill support assembly has a pair of hooked arms; and wherein when deployed the hooked arms engage the top horizontal members of the side panels.

10. The mixing drill stand as recited in claim 9, wherein the drill support assembly further comprises:

a support tray having a shelf defining the central opening, the support tray open to the central opening at its front, the central opening having a width; and a rear wall and side walls extending upwardly from the shelf, a side wall width is defined as a distance between the side walls.

11. The mixing drill stand as recited in claim 10, further comprising an adapter plate, the adapter plate having a width which is slightly smaller than the side wall width for allowing the adapter plate to slide onto the shelf and between the side walls, the adapter plate having a central opening for supporting the mixing drill and allowing the mixing bit to extend downwardly through the central opening of the adapter plate and the central opening of the drill support assembly.

12. The mixing drill stand as recited in claim 11, wherein the adapter plate has a front edge, and wherein a bit slit extends from the front edge to the central opening, the bit slit allowing the mixing drill bit to extend laterally into the central opening of the adapter plate without requiring the mixing drill bit to extend downwardly into the central opening.

* * * * *